US012800310B2

(12) United States Patent
Smiciklas et al.

(10) Patent No.: US 12,800,310 B2
(45) Date of Patent: Nov. 17, 2026

(54) OPTICAL GYROSCOPE PDH OFFSET COMPENSATION

(71) Applicant: Honeywell International Inc., Charlotte, NC (US)

(72) Inventors: Marc Smiciklas, Phoenix, AZ (US); Glen A. Sanders, Scottsdale, AZ (US); Norman Gerard Tarleton, Glendale, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 799 days.

(21) Appl. No.: 18/326,867

(22) Filed: May 31, 2023

(65) Prior Publication Data

US 2024/0401951 A1 Dec. 5, 2024

(51) Int. Cl.
*G01C 19/72* (2006.01)

(52) U.S. Cl.
CPC ......... *G01C 19/721* (2013.01); *G01C 19/727* (2013.01)

(58) Field of Classification Search
CPC ............................ G01C 19/721; G01C 19/727
See application file for complete search history.

(56) References Cited

U.S. PATENT DOCUMENTS

| | | | | |
|---|---|---|---|---|
| 2014/0369699 | A1* | 12/2014 | Strandjord | G01C 19/723 398/187 |
| 2017/0146346 | A1* | 5/2017 | Strandjord | G01C 19/727 |
| 2020/0041269 | A1* | 2/2020 | Strandjord | G01C 19/726 |
| 2021/0262799 | A1* | 8/2021 | Smiciklas | G01C 19/727 |

FOREIGN PATENT DOCUMENTS

| | | | |
|---|---|---|---|
| EP | 2259020 | A2 | 12/2010 |
| EP | 2701250 | A2 | 2/2014 |
| EP | 2942603 | A1 | 11/2015 |
| EP | 2960626 | A1 | 12/2015 |
| EP | 3605020 | A1 | 2/2020 |
| EP | 3869153 | A1 | 8/2021 |
| JP | 2014163939 | A | 9/2014 |

OTHER PUBLICATIONS

European Patent Office, "Extended European Search Report", dated Sep. 4, 2024, from EP Application No. 24161514.5, from Foreign Counterpart to U.S. Appl. No. 18/326,867, pp. 1 through 11, Published: EP.

European Patent Office, "Communication: A corrected written Opinion EPO form 1703 issued by the examiner", dated Sep. 30, 2024, from EP Application No. 24161514.5 from Foreign Counterpart to U.S. Appl. No. 18/326,867, pp. 1 through 9, Published: EP.

* cited by examiner

*Primary Examiner* — Michael A Lyons
(74) *Attorney, Agent, or Firm* — Fogg & Powers LLC

(57) ABSTRACT

A Pound-Drever-Hall (PDH) offset servo circuit is configured to compensate for offset error identified from a received signal in an optical gyroscope. The PDH offset servo circuit determines offset error information from a quadrature-demodulated counterpropagating signal in the optical gyroscope, and uses the offset error information to generate a compensated PDH error signal. The compensated PDH error signal can be used to adjust the setpoint of the PDH loop circuitry, thereby enabling the PDH loop circuitry to generate a control signal to a laser that controls the frequency output of the laser with reduced offset error.

20 Claims, 6 Drawing Sheets

OPTICAL GYROSCOPE PDH OFFSET COMPENSATION

STATEMENT REGARDING FEDERALLY SPONSORED RESEARCH OR DEVELOPMENT

This invention was made with Government support under contract FA9453-20-C-0013 awarded by Air Force Research Laboratory. The Government has certain rights in the invention.

BACKGROUND

The resonator fiber optic gyroscope (RFOG) shows promise in meeting the needs of many navigation and inertial stabilization markets. It has the potential to provide a high rotation sensing performance within a compact volume. An RFOG senses rotation by measuring the frequency difference between optical resonances for counterpropagating light in a fiber ring resonator. This is typically accomplished by coupling separate lasers to the clockwise (CW) and counterclockwise (CCW) optical resonances, and then measuring the center frequencies of those resonances.

To reduce signal noise, optical phase lock loops can be used to stabilize the CW and CCW lasers to a common master laser which has been locked to the optical resonator using a Pound-Drever-Hall (PDH) loop. The resonance tracking loops for the CW and CCW lasers are locked using a common modulation frequency which is also applied to the setpoint of the PDH loop error signal. However, a problem arises when an undesired PDH error signal offset is present. These offsets can not only produce unstable gyroscope operation but also introduce bias errors in the signal due to second harmonic distortion in the modulation frequency by modulating off center on the PDH error signal's nonlinear discriminant slope. For example, the PDH error signal offset has been observed to drift when operating over a large temperature range, thus reducing gyroscope stability as a function of temperature.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one example, a Pound-Drever-Hall (PDH) offset servo circuit is disclosed. The PDH offset servo circuit comprises a first mixer configured to receive a signal corresponding to a clockwise (CW) or counterclockwise (CCW) counter-propagating signal. The PDH offset servo circuit is configured to receive a quadrature demodulation signal at a common frequency. The common frequency is a frequency used for modulating and/or demodulating an output of at least one laser. The first mixer is configured to generate the first signal by demodulating the signal corresponding to the CW or CCW counterpropagating signal with the quadrature demodulation signal. The PDH offset servo circuit comprises a second mixer configured to receive a signal corresponding to a resonance frequency of an optical resonator coupled to the PDH offset servo circuit. The second mixer is configured to generate a third signal by demodulating the signal corresponding to the resonance frequency with a PDH demodulation signal. The PDH offset servo circuit comprises a controller comprising at least one processor coupled to the first mixer and the second mixer. The controller is configured to generate a second signal based on offset error information from the first signal. The controller is configured to combine the second signal with the third signal to generate an output signal. The output signal represents a PDH error signal compensated based on the offset error information.

In another example, a system is disclosed. The system comprises a first laser configured to produce a first signal at a first frequency. The system comprises a second laser configured to produce a second signal at a second frequency. The system comprises at least one modulator coupled to the first laser and the second laser. The at least one modulator is configured to modulate the first signal and the second signal at a common frequency. The system comprises an optical resonator coupled to the first laser and the second laser. The optical resonator comprises an optical coil. The first signal propagates about the optical coil in a clockwise (CW) direction, and the second signal propagates about the optical coil in a counterclockwise (CCW) direction. The system comprises a Pound-Drever-Hall (PDH) system coupled to the optical resonator. The PDH system comprises a PDH offset servo circuit and PDH loop circuitry. The PDH offset servo circuit is configured to receive a third signal corresponding to a resonance frequency of the optical resonator and a fourth signal that corresponds to either the first signal or the second signal. The PDH offset servo circuit is configured to demodulate the fourth signal with a quadrature demodulation signal at the common frequency. The PDH offset servo circuit is configured to determine offset error information from the demodulated fourth signal. The PDH offset servo circuit is configured to generate an output signal based on the offset error information from the demodulated fourth signal and the third signal. The output signal represents a PDH error signal compensated based on the offset error information. The PDH loop circuitry is configured to generate at least one control signal based on the output signal. The at least one control signal is configured to lock the frequency of the first signal and the second signal to the resonance frequency of the optical resonator.

In yet another example, a method for reducing Pound-Drever-Hall (PDH) offset error in an optical gyroscope is disclosed. The method comprises generating, by a PDH offset servo circuit, a first signal by demodulating a signal corresponding to a counterpropagating signal with a quadrature demodulation signal at a common frequency. The counterpropagating signal is one of a clockwise (CW) signal or a counterclockwise (CCW) signal. The common frequency is a frequency used for modulating and/or demodulating an output of at least one laser of the optical gyroscope. The method comprises generating, by the PDH offset servo circuit, a second signal based on offset error information determined from the first signal. The method comprises combining, by the PDH offset servo circuit, the second signal with a signal having the common frequency. The method comprises generating, by the PDH offset servo circuit, an output signal based on the second signal and the signal having the common frequency. The output signal represents a compensated PDH error signal based on the offset error information.

Other examples are also disclosed, as subsequently described.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly summarized below and as described further in conjunction with the detailed description.

Figure 1:
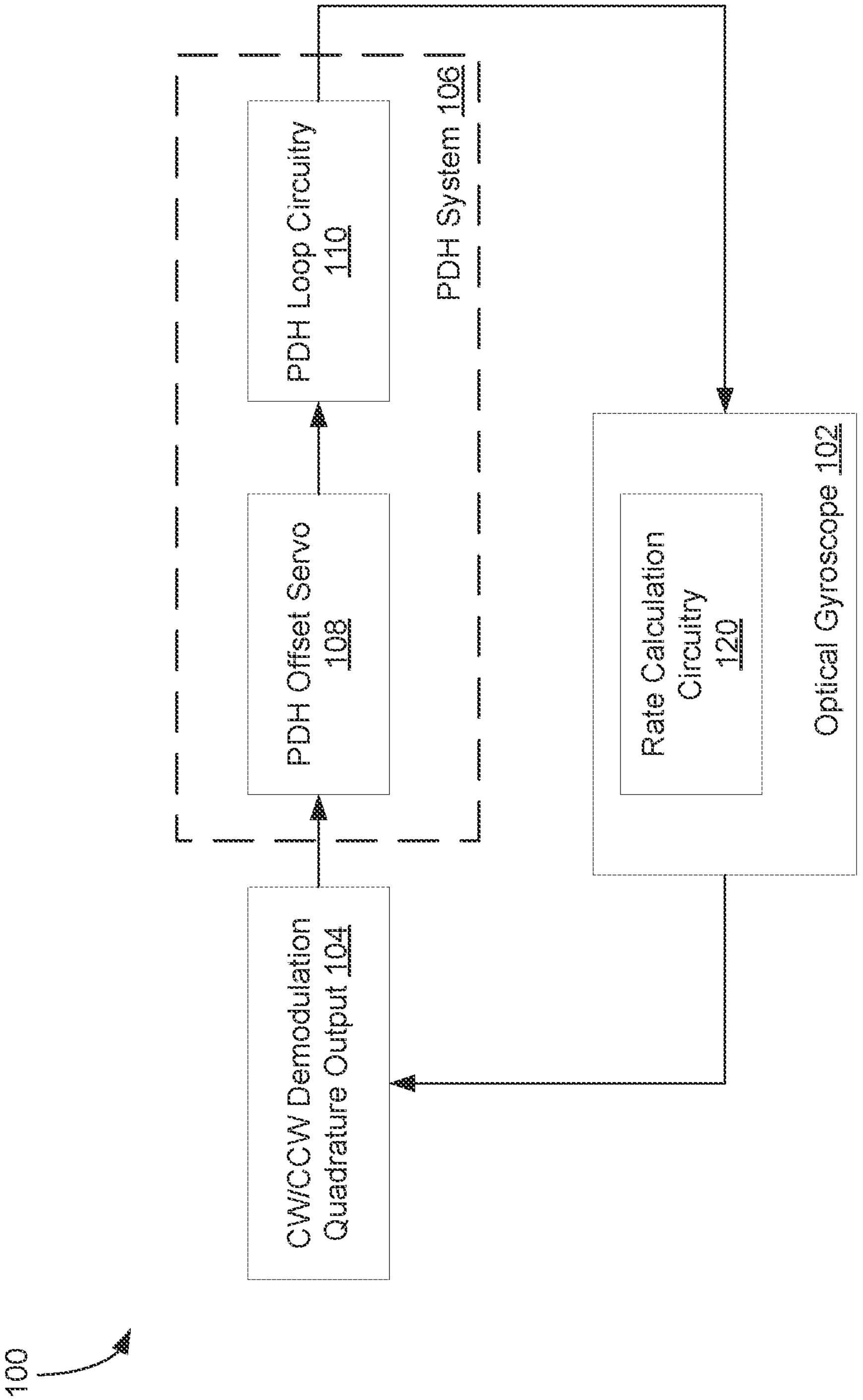
FIG. 1 depicts a block diagram of a system configured to reduce offset error, as described in one or more embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 depicts a block diagram of a system 100 in which the PDH offset compensation described herein can be utilized. The system 100 includes an optical gyroscope 102 and a PDH system 106. The PDH system 106 includes a PDH offset servo 108 coupled to an input of PDH loop circuitry 110. In some examples, PDH offset servo 108 and PDH loop circuitry 110 (alternatively, "PDH circuitry 110") are implemented as discrete subsystems of PDH system 106 or as standalone systems. Alternatively, PDH offset servo 108 can be integrated with PDH loop circuitry 110.

System 100, and the other systems described herein, can be coupled to a vehicle. Use of the term "vehicle" is not intended to be limiting and includes all classes of vehicles falling within the ordinary meaning of the term. This would include but not limited to, aerial traversing vehicles (e.g., commercial, non-commercial, or recreational aircraft), unmanned and/or space traversing vehicles (e.g., satellites, urban air mobility vehicles), water traversing vehicles (e.g. ships, submarines), and land traversing vehicles (e.g., automobiles including cars, trucks, motorcycles). Throughout the disclosure, the vehicle may be further illustrated as an aircraft with the understanding that the principles described herein apply to other vehicles where applicable.

Figure 2:
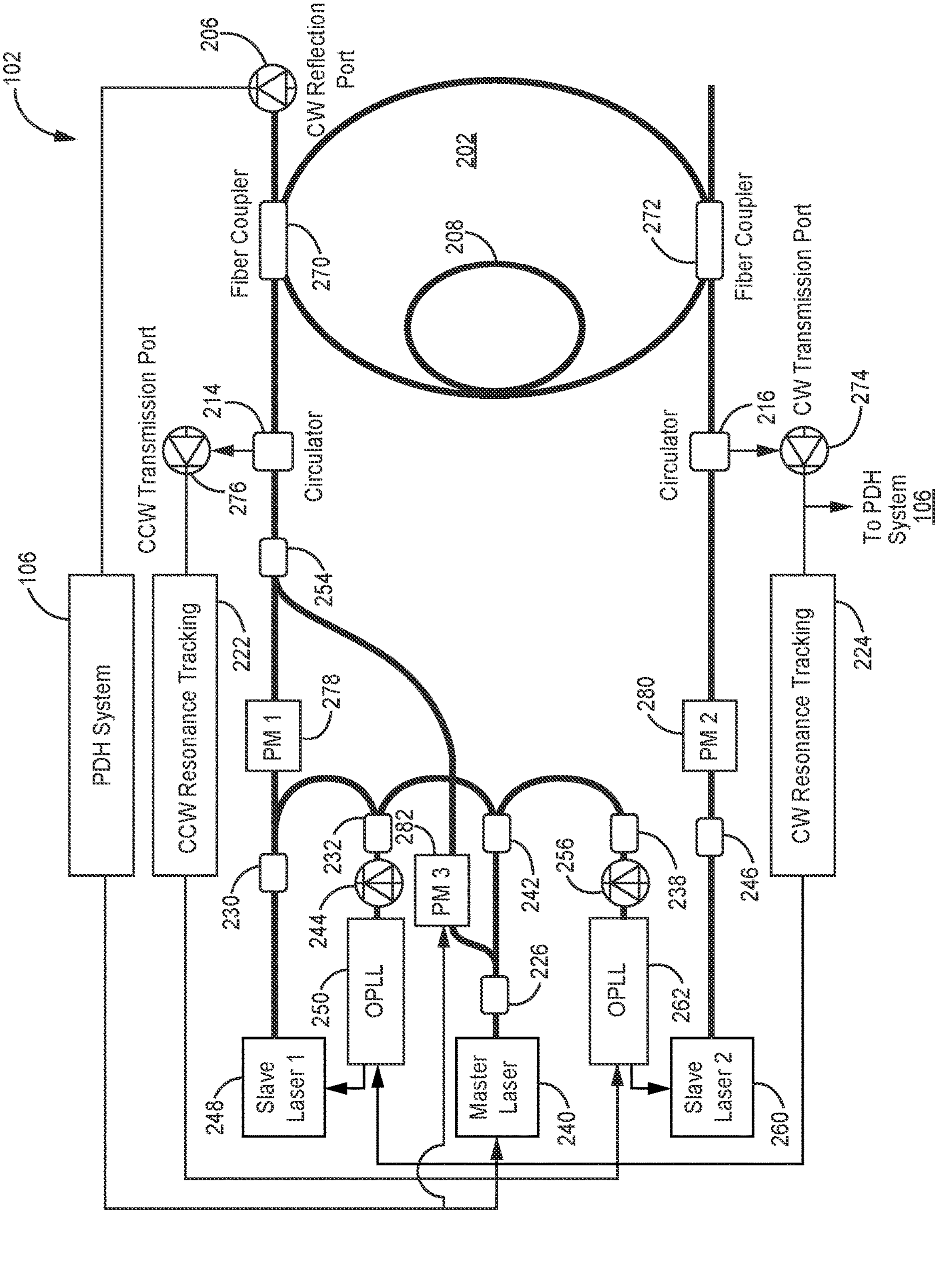
FIG. 2 depicts a block diagram of an exemplary optical gyroscope, as described in one or more embodiments.

Optical gyroscope 102 includes an optical resonator (see FIG. 2) configured for generating a resonance signal at a resonance frequency. In some examples, optical gyroscope is a fiber optic gyroscope (FOG), such as a resonance fiber optic gyroscope (RFOG). One exemplary embodiment of optical gyroscope 102 is shown in FIG. 2 and further described herein.

The PDH system 106 is implemented to maintain the frequency lock between a laser and the resonance frequency of the optical gyroscope 102. As part of its operation, optical gyroscope 102 generates and propagates at least two signals that counterpropagate in the optical resonator. These signals are used to determine various motion parameters of a reference object such as a vehicle. Additionally, these signals are fed back to the optical gyroscope 102 and used to adjust the frequencies of the counterpropagating signals as part of a feedback mechanism. Specifically, optical gyroscope 102 is configured to modulate the counterpropagating signals at a common modulation frequency followed by demodulating the signals at the common modulation frequency once they have been coupled out of the optical resonator. The PDH system 106 uses one of the counterpropagating signals as a reference to lock the output frequency of the laser to a resonant frequency of the optical resonator. Specifically, the PDH system 106 generates a direct current (DC) setpoint in which a common modulation signal is applied. The output of the PDH system 106 includes at least one control signal that configures the laser based on the DC setpoint modulated with the common modulation signal. For example, in the three-laser configuration described with respect to FIG. 2, the PDH system 106 can modulate the frequency output of the slave lasers 248, 260 indirectly via the output from master laser 240.

The counterpropagating signals utilized by system 100 can be demodulated by an in-phase demodulation signal or a quadrature demodulation signal at the common demodulation frequency. However, the PDH loop circuitry 110 is not perfect and can be prone to offset error. While the control signal provided by the PDH loop circuitry 110 can be used for frequency locking the master laser of the optical gyroscope 102 to the resonance frequency, the PDH loop circuitry 110 may produce a faulty locking signal attributed to PDH offset error that results from using a value of the PDH error signal that is not centered. Such a PDH offset error is difficult to detect and can cause the PDH circuitry 110 to determine an incorrect resonance frequency and cause the master laser of the optical gyroscope 102 to drift away from the true resonance frequency of the optical resonator, thereby resulting in inaccurate measurements and gyroscope instability.

System 100 is configured to reduce PDH offset error via the PDH offset servo 108. PDH offset servo 108 is configured to receive, among other signals, a quadrature demodulation signal at the common demodulation frequency, to determine a quadrature output 104 that corresponds to a CW or CCW signal, and to control one or more components of the PDH circuitry 110 based on offset error information determined from the quadrature output 104. In doing so, the PDH system 106 can compensate for PDH offset error when configuring the optical gyroscope 102 to lock onto the resonance frequency.

FIG. 2 illustrates a block diagram of one embodiment of an optical gyroscope 102. The optical gyroscope 102 is described herein in the context of FIG. 2 as an RFOG; however, other optical gyroscopes can be used. Reduction of offset error is facilitated by a PDH system 106 including the PDH offset servo 108 as described in the context of FIG. 1.

The exemplary RFOG 102, illustrated in FIG. 2, includes a master laser 240, a clockwise (CW) slave laser 248, a counterclockwise (CCW) slave laser 260, an optical resonator circuit 202, a CW optical phase lock loop (CW OPLL) (or CW OPLL circuitry) 250, CCW optical phase lock loop (CCW OPLL) (or CCW OPLL circuitry) 262, a Pound-Drever-Hall (PDH) system 106, an optical fiber coil (fiber coil) 208, a CCW resonance tracking servo (or CCW resonance tracking servo circuitry) 222, and CW resonance tracking servo (or CW resonance tracking servo circuitry)

224. This illustrated embodiment is described for pedagogical purposes, and the various embodiments of the invention can be implemented using systems with configurations which differ from the configuration illustrated in FIG. 2. Signals emitted by the CW slave laser 248, the CCW slave laser 260, and the master laser 240 may be referred to herein respectively as the CW optical signal, the CCW optical signal, and the master optical signal. In some embodiments, the master laser 240, CW slave laser 248, and CCW slave laser 260 and the other components of optical gyroscope 102 can be implemented on an integrated photonics circuit chip or other photonics circuit.

Further, the RFOG architecture of FIG. 2 is just one architecture of an optical gyroscope which can be used with the techniques described herein to reduce offset bias error. For example, the PDH system 106 can be coupled to the CCW resonance tracking servo 222 and receive the CCW signal or PDH system 106 can be coupled to the CW resonance tracking servo 224 and receive the CW signal. In other examples, some of the components of the optical gyroscope 102 can be implemented as part of the optical resonator 202 such as the circulators 214, 216; such components can be integrated with the optical resonator 202 on an optical bench.

In the example shown in FIG. 2, the optical gyroscope 102 includes optical couplers 226, 230, 232, 238, 242, 246, 254, a first photodetector 244, and a second photodetector 256, which are suitably connected by waveguides or other guided optics. Optionally, the optical gyroscope 102 is implemented on a substrate comprising a semiconductor or insulator. Optionally, silicon may be used as the semiconductor material. Each of the optical couplers 226, 230, 232, 238, 242, 246, 254 may function as a beam splitter and/or as a beam combiner. Photodetectors described herein may be implemented by photodiodes or other suitable components.

The master laser 240 generates and outputs an optical signal that is received at optical coupler 226. A portion of the optical signal is redirected to phase modulator (PM) 282, which uses the optical signal from the master laser 240 and the control signal from the PDH system 106 to generate a phase-modulated optical signal that is subsequently mixed with the output from CW slave laser 248 at optical coupler 254. Another portion of the optical signal from master laser 240 is split at optical coupler 242 and used to lock the outputs of slave lasers 248, 260 to the frequency of the master laser 240. A first portion of the optical signal is provided to optical coupler 232, along with a portion of the output signal from CW slave laser 248 via optical coupler 230. The two portions are mixed at optical coupler 232 and received at photodetector 244. Photodetector 244 is configured to generate an electrical signal that corresponds to the mixed signal received from optical coupler 232, and provides the electrical signal to an optical phase lock loop (OPLL) circuit 250. OPLL 250 also receives a signal from CW resonance tracking servo 224 representing the resonant frequency of optical resonator 202. OPLL 250 is configured to generate an output optical signal from the electrical signal from photodetector 244 and the output signal from CW resonance tracking servo 224. The output from OPLL 250 configures the CW slave laser 248 to generate an output optical signal with a frequency corresponding to the frequency of the output signal from master laser 240. For example, the OPLL 250 controls a carrier frequency of the optical signal emitted by the CW slave laser 248.

A similar process is used to lock the frequency output of the CCW slave laser 260 to the output frequency of the master laser 240. A second portion of the optical signal from master laser 240 is provided to optical coupler 238 and received at photodetector 256. Photodetector 256 is configured to generate an electrical signal that corresponds to the mixed signal received from optical coupler 238, and provides the electrical signal to an optical phase lock loop (OPLL) circuit 262. OPLL 262 also receives a signal from CCW resonance tracking servo 222 representing the resonant frequency of optical resonator 202. OPLL 262 is configured to generate an output optical signal from the electrical signal from photodetector 256 and the output signal from CCW resonance tracking servo 222. The output from OPLL 262 configures the CCW slave laser 260 to generate an output optical signal with a frequency corresponding to the frequency of the output signal from master laser 240. For example, the OPLL 262 controls a carrier frequency of the optical signal emitted by the CCW slave laser 260.

The optical signals output from slave lasers 248, 260 are phase-modulated by respective phase modulators 278, 280. For the CW signal, another phase modulator 282 combines the output from PDH system 106 and master laser 240, and the resultant output signal is phase-modulated. The two phase-modulated outputs from phase modulator 278 and phase modulator 282 are mixed at optical coupler 254, and provided to circulator 214. Circulator 214 passes the CW optical signal to fiber coupler 270, which couples the CW optical signal into the optical resonator 202, where the CW optical signal is allowed to circulate multiple times in the fiber coil 208 of the optical resonator 202. Similarly, the CCW optical signal is provided to circulator 216 from phase modulator 280. Circulator 216 passes the CCW optical signal to fiber coupler 272, which couples the CCW optical signal into the optical resonator 202 and fiber coil 208 in the CCW direction.

After circulating through the optical resonator 202, a portion of the CW optical signal exits the resonator via fiber coupler 272 and the CCW optical signal exits the resonator via fiber coupler 270. Fiber couplers 270, 272 provide the CW and CCW optical signals to circulators 214, 216 respectively. For the CW signal, circulator 216 provides the CW signal to photodetector 274, which converts the CW optical signal to a corresponding electrical signal. CW resonance tracking servo 224 is configured to generate an offset CW signal based on the electrical CW signal. This offset CW signal is used to adjust the output frequency of the CW slave laser 248 via the OPLL 250. For the CCW, circulator 214 provides the CCW signal to photodetector 276, which converts the CCW optical signal to a corresponding electrical signal. CCW resonance tracking servo 222 is configured to generate an offset CCW signal based on the electrical CCW signal. This offset CCW signal is used to adjust the output frequency of the CCW slave laser 260 via the OPLL 262. The offset CCW signal and the offset CW signal each comprise a frequency used to tune respectively the CCW slave laser 260 and the CW slave laser 248. Specifically, the carrier frequencies of the optical signals of the CCW slave laser 260 and the CW slave laser 248 are tuned to respectively CCW and CW resonant frequencies of the resonator 202. Although not explicitly shown in FIG. 2, optical gyroscope 102 includes rate calculation circuitry 120, which is configured to receive the offset CW and CCW signals from CW resonance tracking servo 224 and CCW resonance tracking servo 222, respectively, and is configured to determine a rotation rate based on a frequency difference between the offset CW and CCW signals.

Additionally, a portion of one of the counterpropagating signals (the CW optical signal in FIG. 2) exits the optical resonator 202 through fiber coupler 270 and is detected by photodetector 206. Photodetector 206 is configured to provide an electrical signal proportional to the optical power incident upon the photodetector 206. The electrical signal (PDH electrical signal) is provided to the PDH system 106 for controlling the frequency of the master laser 240 to the resonance frequency of the optical resonator 202. The electrical signal from photodetector 206 varies in amplitude based upon the amount of differential phase present in the CW signal; the amplitude of the signal is utilized by the PDH system 106 to modulate the carrier frequency of the master laser 240. Modulating the frequency of the master laser 240 based on the output of PDH system 106 stabilizes the output of the master laser 240 and reduces relative phase noise between carrier frequency of the master laser and the resonance frequencies of the resonator 202.

In the systems described in FIGS. 1-2, the CW and CCW signals are modulated at a common frequency by the respective resonance tracking servos 224, 222 to lock the CW and CCW signals to the frequency of the optical resonator 202. The master laser 240 locks onto the resonance frequency of the optical resonator 202 via the output of the PDH system 106, which also uses the common frequency to modulate the PDH loop setpoint. As used herein, a "common frequency" modulation is one that modulates each of the counter-propagating signals in the optical gyroscope 102 at the same frequency. Accordingly, the CW and CCW slave lasers 248, 260 are both indirectly locked to the frequency of the master laser 240 via the respective OPLLs 250, 262.

Figure 3A:
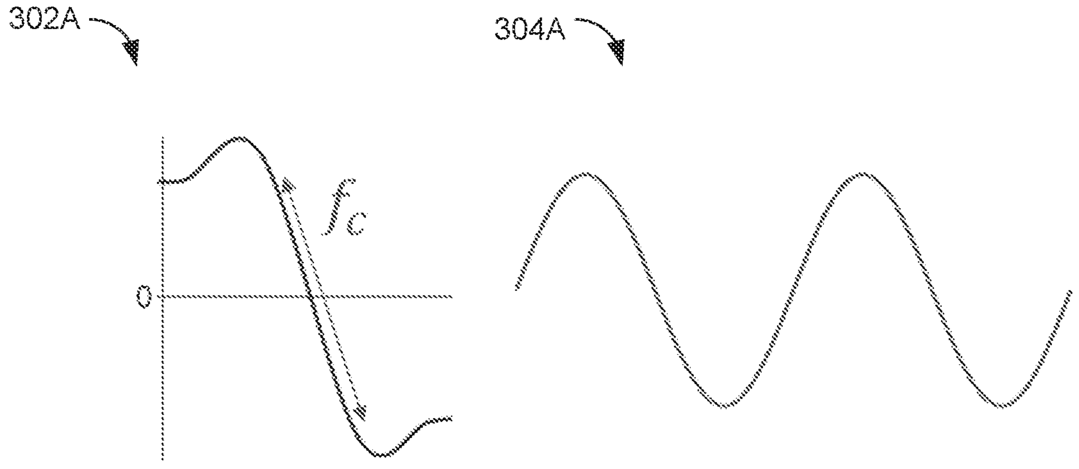
FIGS. 3A-3C depict graphical representations of modulating a PDH error signal.
Figure 3B:
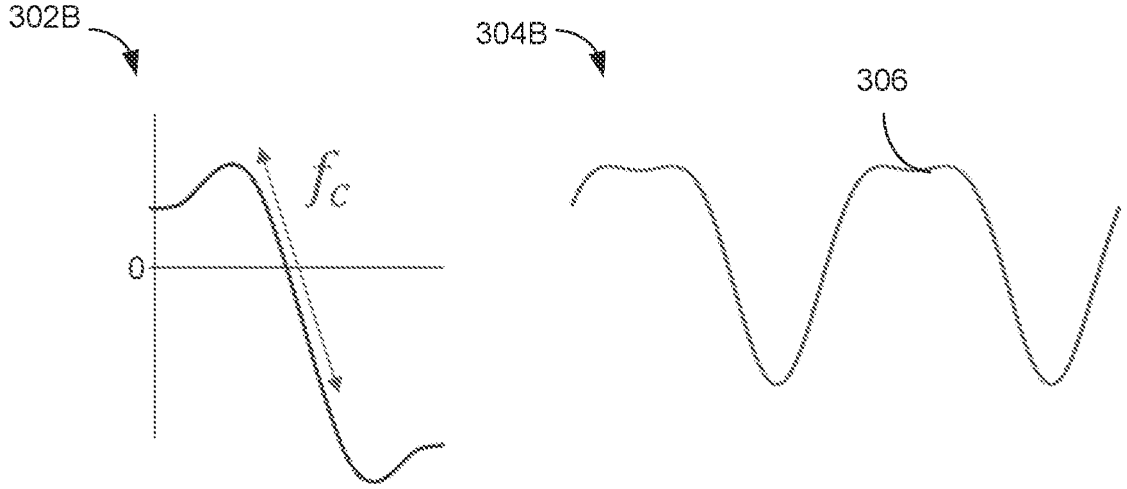
Figure 3C:
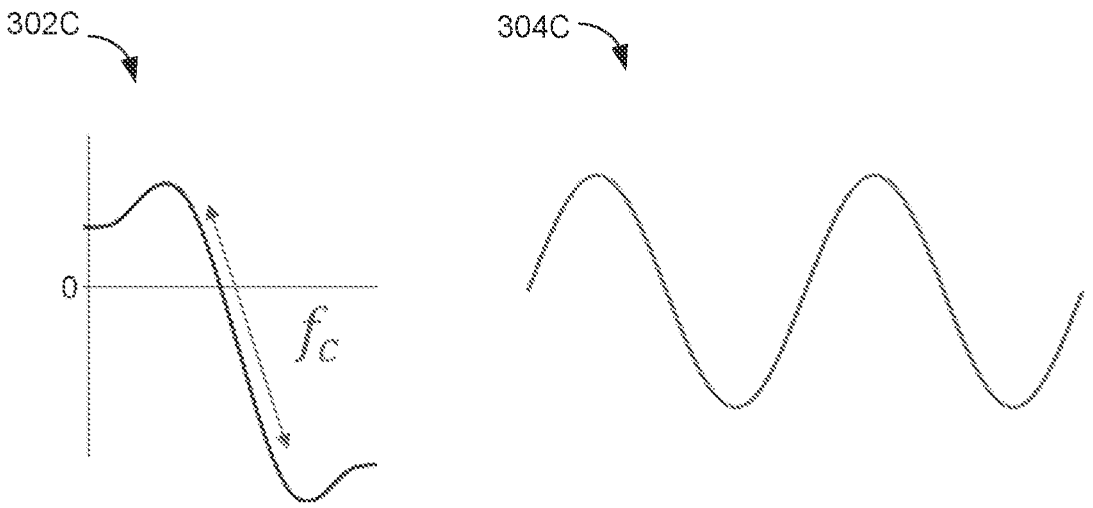

Exemplary graphical representations of modulating a PDH error signal are depicted in FIGS. 3A-3C. Referring to FIG. 3A, a PDH error signal 302A is shown that corresponds to a resonance frequency of the optical resonator 202. The PDH error signal 302A is illustrated as a curve in which the vertical (y) axis represents the amplitude of the PDH error signal, and the horizontal (x) axis represents the time. This signal is used by the PDH circuitry 110 to generate the control signal for locking the master laser 240 to the resonance frequency of the optical resonator 202.

The PDH error signal 302A is subsequently modulated (e.g., at the output of the master laser 240) with a common frequency signal $f_c$, thereby generating a periodic waveform 304A of the modulated optical signal. If the common modulation is performed on a PDH error signal that is perfectly "centered" about the horizontal axis, the periodic waveform 304A generated will closely resemble an ideal sinusoidal wave; that is, a wave that is perfectly harmonic with no aberrations or distortions to the curvature or periodicity of the waveform. "Centering" the PDH error signal 302A about the horizontal axis means that the PDH error signal 302A is symmetric about the horizontal axis such that curve representing the signal is evenly distributed above and below the horizontal axis (which, as represented by FIG. 3A, is at the x=0 line). By centering the PDH error signal 302A, the master laser 240 (and slave lasers 248, 260 indirectly via the master laser 240) can output a stable optical signal at the resonance frequency of the optical resonator 202.

But, in some situations, the PDH error signal is not perfectly centered when applying common frequency modulation. During operation of the optical gyroscope 102, environmental parameters such as temperature near the gyroscope, design imperfections in the optics or electronics, noise, or other conditions have the potential to introduce offset error when detecting the resonance signal. As a result, the PDH error signal may be off-centered or "offset" as shown in FIG. 3B. The PDH error signal 302B provides one example of an offset signal in which more of the slope is distributed below the x-axis (i.e., y<0) than above the x-axis (i.e., y>0). Performing common frequency modulation on the offset signal 302B then produces a waveform 304B such as the one shown in FIG. 3B. In contrast to waveform 304A, waveform 304B is not perfectly harmonic and includes notable aberrations 306 at or near the crest of the wave. Such aberrations 306 can lead to second harmonic distortions when tracking the CW and CCW signals in the optical gyroscope 102. Specifically, second harmonic distortions can risk gyroscope instability, and as a result, risks confidence in the accuracy of measurements calculated using gyroscope signals (for example, by rate calculation circuitry 120).

Examples of the present disclosure aim to correct offset in the PDH error signal 302B so that the modulated waveform generated with the common modulation frequency can resemble waveform 304A even when offset is present in the PDH error signal 302B. Referring to FIG. 3C, the PDH offset servo circuit 108 may receive a PDH error signal as shown by signal 302C. Similar to FIG. 3B, the PDH error signal 302C is offset from the x=0 line, which could lead to aberrations. However, unlike FIG. 3B, the PDH offset servo circuit 108 is configured to compensate for the offset present in the PDH error signal 302C, so that common frequency modulation is applied on the PDH error signal 302C evenly between the two extrema points on the curve. As a result, the modulated waveform 304C generated from the PDH error signal 302C contains little to no aberrations, even when offset error is present in the PDH error signal 302C.

Figure 4:
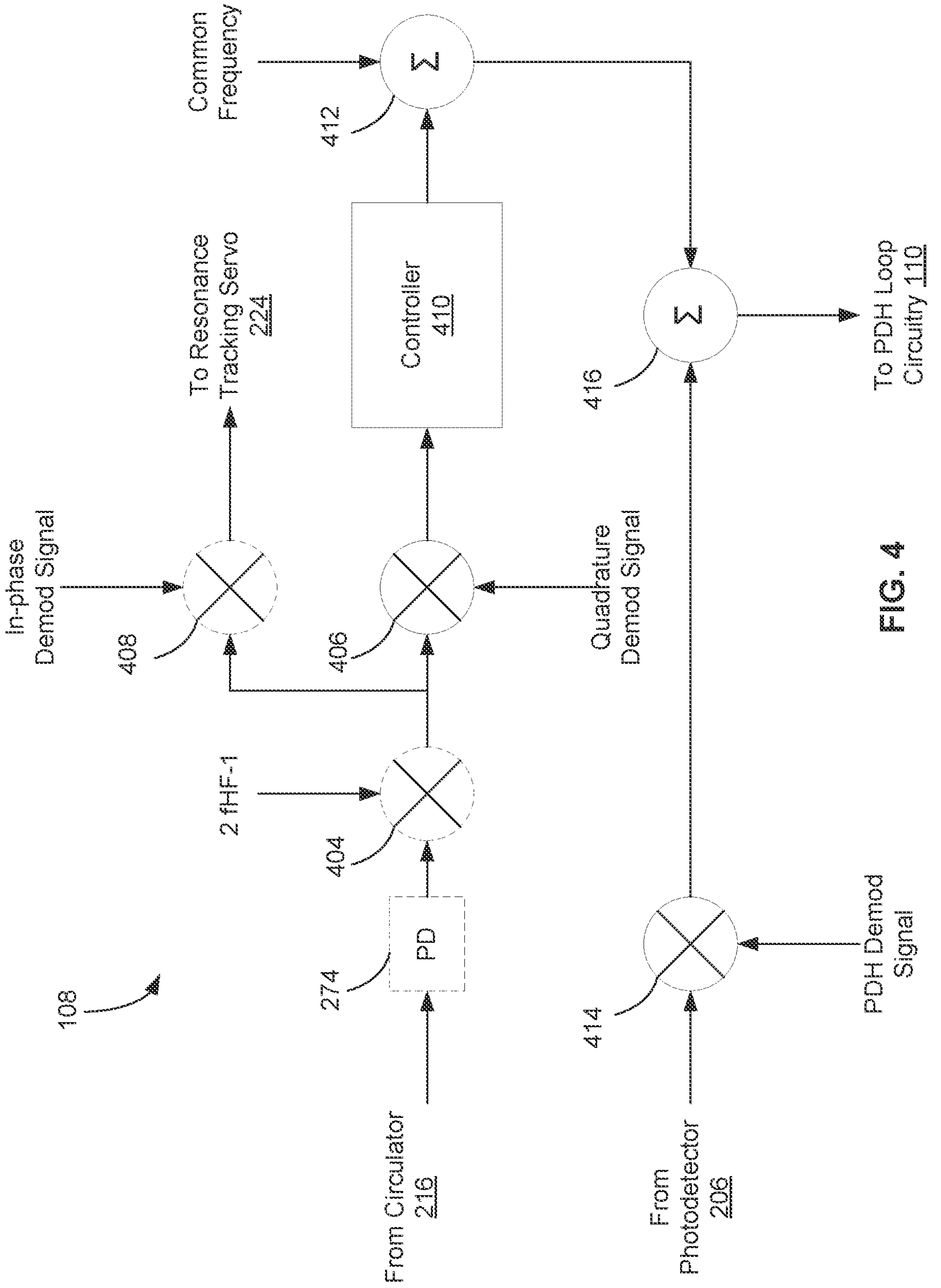
FIG. 4 depicts a block diagram of an exemplary PDH offset servo, as described in one or more embodiments.

FIG. 4 depicts one example of a PDH offset servo 108 configured to reduce PDH offset errors that can contribute to producing second harmonic distortion. The PDH offset servo 108 depicted in FIG. 4 is exemplary and can be implemented as the PDH offset servo 108 as shown in FIG. 1 and/or as part of the PDH system 106 described in FIG. 2.

As shown in FIG. 4, circulator 216 provides an optical signal that corresponds to one of the propagating signals in the optical resonator 202 to photodetector 274, as additionally illustrated in FIG. 2. In this example, the optical signal corresponds to the CW optical signal; however, in other examples the optical signal can be the CCW signal. If the received optical signal corresponds to the CCW signal, then the PDH offset servo 108 (and by extension PDH system 106) is configured to lock the output of the master laser 240 to the resonance frequency based on the CCW signal instead of the CW signal.

PDH offset servo 108 optionally includes a mixer 404 coupled to the output of the photodetector 274. Mixer 404 receives an electrical signal that corresponds to the CW signal and optionally performs pre-demodulation by mixing the CW signal with a signal of frequency $f_{HF\text{-}1}$. Mixer 404 (or photodetector 274 if mixer 404 is not implemented) is coupled to a plurality of signal paths that provide the output of mixer 404 (or photodetector 274 if mixer 404 is not implemented) to respective mixers 406, 408. In one signal path, the CW signal is provided to optional mixer 408. Mixer 408 is configured to demodulate the CW signal with an in-phase demodulation signal at the common frequency $f_c$. In some examples, the in-phase demodulation signal is represented by a cosine wave of the form $\cos(2\pi f_c)$. The common demodulation signal can be generated, for example, by a signal generator that is coupled to the mixer 408. As a result, mixer 408 generates an in-phase component of the demodulated CW signal. The demodulated CW signal is provided to CW resonance tracking servo 224 to use for locking the output of the CW laser 248 to the frequency of the master laser 240. In some examples, mixer 408 is implemented as part of the CW resonance tracking servo 224 instead of by the PDH offset servo 108, and hence is an optional component.

At the other signal path, the CW signal is provided to mixer 406. Mixer 406 is configured to demodulate the CW signal with a quadrature demodulation signal at the common frequency $f_c$. In some examples, the quadrature demodulation signal is represented by a sine wave of the form sin $(2\pi f_c)$. In doing so, mixer 406 generates a quadrature-demodulated CW signal. In contrast to the in-phase component, the quadrature-demodulated CW signal corresponds to a representation of the phase of the carrier frequency. For a perfectly centered PDH error signal (i.e., no offset error present), the quadrature-demodulated CW signal will be zero, indicating that no offset error is present. Hence, in some examples the output of mixer 406 represents the demodulated CW signal without a phase offset. For off-centered PDH error signals, the quadrature-demodulated output by the mixer 406 will be non-zero.

The output from mixer 406 is coupled to a controller 410. Controller 410 is configured to generate a control signal based on the quadrature-demodulated CW signal output from mixer 406. Controller 410 includes one or more processors configured to determine PDH offset error information from the quadrature-demodulated CW signal, and includes circuitry configured to generate control signals that configure the PDH circuitry 110 based on the determined PDH offset error information. For example, the PDH offset error information from the quadrature-demodulated CW signal can include the amplitude of the quadrature-demodulated CW signal, the common frequency, and other parameters.

In some examples, controller 410 comprises a proportional-integral-derivative (PID) controller. In these examples, controller 410 can include a proportional correction circuit configured to determine a proportional correction value based on a current measured offset error value, an integral correction circuit configured to determine an integral correction value based on an accumulation of offset error values over a period of time, and a derivative correction circuit configured to determine a derivative correction value based on a rate of change of offset error values. In some examples, each of the proportional, integral, and derivative correction values is based on a difference between a threshold value and the offset error value from the received CW signal. In additional examples, the threshold value corresponds to a target offset value where the offset error value is zero (i.e., no offset bias is present). Based on the proportional, integral, and derivative correction values, controller 410 is configured to generate an output that compensates for the offset error present in the CW signal (if any).

In the example of FIG. 4, the output of controller 410 is summed with the common frequency at summing node 412. For example, the output of controller 410 represents a DC offset that is applied to the common frequency so as to center the PDH loop setpoint at the output of summing node 412. The output of summing node 412 can be represented as a sinusoidal wave at the common frequency that is shifted based on the DC offset provided by the controller 410.

Controller 410 can be implemented using other processing and/or control circuitry. Controller 410 may include any one or combination of processors, microprocessors, digital signal processors, application specific integrated circuits, field programmable gate arrays, and/or other similar variants thereof. The processing and/or control circuitry may also include, or function with, software programs, firmware, or other computer readable instructions for carrying out various process tasks, calculations, and control functions. These instructions are tangibly embodied on a program product comprising any storage media (or computer readable media) used for storage of computer readable instructions or data structures. Such processing and/or control circuitry enables controller 410 to analyze a received quadrature-demodulated signal and configure the PDH circuitry 110 to compensate for offset error information identified from the quadrature-demodulated signal.

PDH offset servo 108 also includes a mixer 414, which is configured to receive the reflected resonance signal from the optical resonator 202 (e.g., from photodetector 206). Mixer 414 is configured to demodulate this signal with a PDH demodulation signal at a frequency selected for use by the PDH system 106 (which is independent from $f_c$). The output of mixer 414 then corresponds to the demodulated resonance peak signal that is subsequently used to lock the output of the master laser 240 to the frequency of the optical resonator 202. Both the output from summing node 412 and the output from mixer 414 is provided to a summing node 416. Summing node 416 combines the two outputs to generate an error signal that is compensated based on the offset error information identified from the quadrature-demodulated signal. That is, the error signal is configured to reduce or eliminate the PDH offset error when applying common frequency modulation to the counterpropagating CW and CCW signals. The resulting common frequency modulation on the PDH error signal generates a waveform similar to waveform 304C, which contributes to reduced second harmonic distortion in the optical gyroscope 102.

The PDH offset servo 108 can be implemented in different ways from the exemplary embodiments shown in FIG. 4. Although three distinct mixers 404, 406, 408 are depicted in FIG. 4, in other examples, a single mixer can be used to combine each of the input signals. In this alternative embodiment, the mixer can include different output ports that correspond to the different signals output to the CW resonance tracking servo 224 and the controller 410. In examples where pre-demodulation is not used, mixer 404 and its associated mixing functionality is not included. In some examples, the summing nodes 412, 416 are replaced by a single summing node that receives the outputs from both controller 410 and from mixer 414. The summing node(s) are optionally part of the controller 410. Other optics and electronics may be implemented in the PDH offset servo 108. In some embodiments, PDH offset servo 108 (and PDH system 106 more generally) is integrated with the optical gyroscope 102 (e.g., by implementing both systems on the same substrate). The PDH offset servo 108 can include different components than the components shown in FIG. 4, and can reduce offset error in other ways.

As shown in FIG. 1, the PDH offset servo 108 operates as a feedback mechanism to continuously adjust the DC setpoint of the PDH circuitry 110 in response to offset error detected from the CW (or CCW) signal as described above. Once the PDH circuitry 110 generates a locking signal to the master laser 240, and the master laser signal is combined with the CW signal and enters the optical resonator 202, the resonance signal from photodetector 206 and the CW signal from photodetector 274 are used again to determine any offset error present in the quadrature-demodulated CW signal and to reduce the offset error present when attempting to maintain the frequency lock between the master laser 240 and the optical resonator 202.

Figure 5:
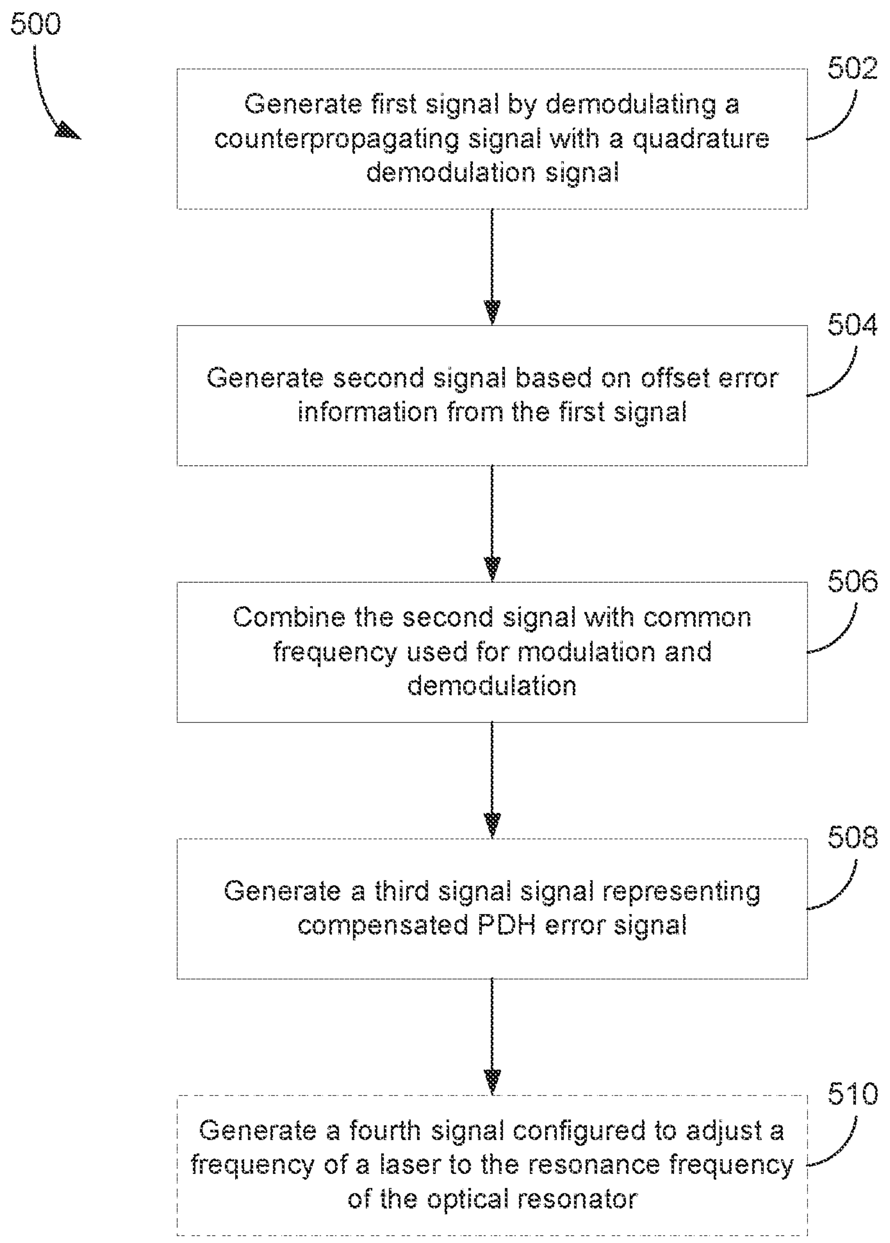
FIG. 5 depicts a flow diagram of a method for reducing offset error in an optical gyroscope, as described in one or more embodiments.

FIG. 5 depicts a flow diagram of a method 500 for reducing offset error in an optical gyroscope. Method 500 may be implemented via the techniques described with respect to FIGS. 1-4, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner). Method 500 is implemented by a PDH offset servo coupled to PDH circuitry, both of which can be integrated in a PDH system.

Method 500 includes generating a first signal at block 502. The first signal is generated by demodulating a signal corresponding to a counterpropagating signal (for example, a CW or CCW signal) with a quadrature demodulation signal (e.g., a sine wave signal having the common frequency). The counterpropagating signal is, or is derived from, a signal that was generated by one of the counterpropagating lasers. The demodulation signal is one that is used to demodulate the counterpropagating signal at a common frequency to demodulate other signals propagating in the optical gyroscope. The first signal is representative of the quadrature-demodulated counterpropagating signal received by the PDH offset servo circuit. Referring to FIG. 4, in some examples, the function described in block 502 is performed by mixer 406.

Method 500 further includes generating a second signal at block 504. The second signal is generated based on offset error information determined from the quadrature-demodulated counterpropagating signal. Referring to FIG. 4, in some examples, the function described in block 504 is performed by controller 410. In some examples, to generate the second signal further comprises generating, by the controller 410, a DC offset based on offset error information determined from the quadrature-demodulated counterpropagating signal (such as the amplitude, phase, or frequency of the demodulation signal).

Method 500 further includes combining the second signal with the common frequency at block 506. The common frequency is used for modulating and demodulating the PDH error signal as well as the frequency used for modulating and demodulating the counterpropagating signals at the resonance tracking servos (e.g., the CW resonance tracking servo 224 and CCW resonance tracking servo 222). Referring to FIG. 4, in some examples, the function described in block 506 is performed by summing node 412 (which can be implemented as part of the controller 410). The combined output is configured to adjust a DC offset value of the PDH loop setpoint. For example, the combined output resembles a sinusoidal wave at the common frequency that is shifted in amplitude based on the DC offset of the output from the controller.

Method 500 further includes generating a third signal representing the compensated PDH error signal at block 508. Referring to FIG. 4, the PDH error signal is generated by demodulating the resonance signal with the PDH demodulation signal at mixer 414. The PDH error signal is then compensated for the offset error present in the counterpropagating signal at the summing node 416. Referring to FIG. 4, in some examples, the function described in block 508 is performed by summing node 416 (which can be implemented as part of the controller 410). As previously noted, in some examples the summing nodes 412 and 416 can be implemented as a single summing node. In this example, the functions of blocks 506 and 508 can be performed simultaneously. by combining the second signal generated at the output of controller 410 with the output of mixer 414 and the common frequency.

Method 500 optionally includes generating a fourth signal configured to adjust a frequency of a laser to a frequency of the optical resonator at block 510. In some examples, the PDH circuitry 110 generates a control signal that locks the master laser output to the frequency of the optical resonator. By using the compensated PDH error signal, the PDH circuitry can use control the master laser with reduced offset error, which thereby reduces second harmonic distortion when modulating the output from the slave lasers on the common frequency (see waveform 304C).

As described in the context of method 500 and in the description more generally, the use of "first" signal, "second" signal, and other numerical identifiers is meant to merely distinguish one signal from another signal, and is not necessarily inherent to a particular signal. Therefore, a "first signal" could be defined as a "second signal" and vice versa, depending on the context.

The methods and techniques described herein may be implemented (at least in part) in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically erasable programmable read-only memory (EEPROM), and flash memory devices; magnetic disks such as internal hard disks and removable disks; magneto-optical disks; and digital video disks (DVDs). Any of the foregoing may be supplemented by, or incorporated in, specially-designed application specific integrated circuits (ASICs).

Example Embodiments

Example 1 includes a Pound-Drever-Hall (PDH) offset servo circuit, comprising: a first mixer configured to receive a signal corresponding to a clockwise (CW) or counterclockwise (CCW) counterpropagating signal, and to receive a quadrature demodulation signal at a common frequency, wherein the common frequency is a frequency used for modulating and/or demodulating an output of at least one laser, wherein the first mixer is configured to generate the first signal by demodulating the signal corresponding to the CW or CCW counterpropagating signal with the quadrature demodulation signal; a second mixer configured to receive a signal corresponding to a resonance frequency of an optical resonator coupled to the PDH offset servo circuit, wherein the second mixer is configured to generate a third signal by demodulating the signal corresponding to the resonance frequency with a PDH demodulation signal; and a controller comprising at least one processor coupled to the first mixer and the second mixer, wherein the controller is configured to: generate a second signal based on offset error information from the first signal, and combine the second signal with the third signal to generate an output signal, wherein the output signal represents a PDH error signal compensated based on the offset error information.

Example 2 includes the PDH offset servo circuit of Example 1, wherein the output signal is configured to adjust a direct current (DC) offset value of a PDH loop setpoint based on the offset error information.

Example 3 includes the PDH offset servo circuit of any of Examples 1-2, wherein the controller comprises a first summing node, wherein the first summing node is configured to: receive a signal having the common frequency; and generate a fourth signal based on the offset error information and the signal having the common frequency.

Example 4 includes the PDH offset servo circuit of Example 3, wherein the first summing node is configured to: receive the third signal from the second mixer; and generate the output signal based on the third signal and the fourth signal, wherein the fourth signal represents the PDH error signal compensated based on the offset error information.

Example 5 includes the PDH offset servo circuit of any of Examples 1-4, wherein the offset error information includes at least one of: an amplitude of the first signal, or the common frequency.

Example 6 includes the PDH offset servo circuit of any of Examples 1-5, wherein the controller comprises a proportional-integral-derivative (PID) controller or a proportional-integral (PI) controller.

Example 7 includes a system, comprising: a first laser configured to produce a first signal at a first frequency; a second laser configured to produce a second signal at a second frequency; at least one modulator coupled to the first laser and the second laser, wherein the at least one modulator is configured to modulate the first signal and the second signal at a common frequency; an optical resonator coupled to the first laser and the second laser, wherein the optical resonator comprises an optical coil, wherein the first signal propagates about the optical coil in a clockwise (CW) direction, wherein the second signal propagates about the optical coil in a counterclockwise (CCW) direction; a Pound-Drever-Hall (PDH) system coupled to the optical resonator, wherein the PDH system comprises a PDH offset servo circuit and PDH loop circuitry, wherein the PDH offset servo circuit is configured to receive a third signal corresponding to a resonance frequency of the optical resonator and a fourth signal that corresponds to either the first signal or the second signal; wherein the PDH offset servo circuit is configured to: demodulate the fourth signal with a quadrature demodulation signal at the common frequency, determine offset error information from the demodulated fourth signal, and generate an output signal based on the offset error information from the demodulated fourth signal and the third signal, wherein the output signal represents a PDH error signal compensated based on the offset error information; wherein the PDH loop circuitry is configured to generate at least one control signal based on the output signal, wherein the at least one control signal is configured to lock a frequency of a laser to the resonance frequency of the optical resonator.

Example 8 includes the system of Example 7, comprising a master laser coupled to the first laser and the second laser, wherein the master laser is configured to generate a master signal at a third frequency that is combined with the first signal and/or the second signal; a first phase lock loop circuit coupled to an input of the first laser, wherein the first phase lock loop circuit is configured to lock the first frequency of the first signal to the third frequency; and a second phase lock loop circuit coupled to an input of the second laser, wherein the second phase lock loop circuit is configured to lock the second frequency of the second signal to the third frequency; wherein the at least one control signal from the PDH loop circuitry is configured to lock the third frequency of the master laser to the resonance frequency of the optical resonator, wherein the first laser and the second laser are configured to use the master signal generated based on the PDH error signal in locking the respective first signal and the second signal to the resonance frequency of the optical resonator.

Example 9 includes the system of any of Examples 7-8, comprising rate calculation circuitry, wherein the rate calculation circuitry is configured to determine a rate of rotation of a vehicle based on a frequency difference between the first signal and the second signal.

Example 10 includes the system of any of Examples 7-9, wherein the PDH offset servo circuit is configured to adjust a direct current (DC) offset value of a PDH loop setpoint based on the offset error information.

Example 11 includes the system of any of Examples 7-10, wherein the PDH offset servo circuit is configured to: determine a proportional correction value based on a measured value of the offset error information; determine an integral correction value based on an accumulation of the offset error information over a period of time; and generate the output signal based on the proportional correction value and the integral correction value.

Example 12 includes the system of any of Examples 7-11, wherein the PDH loop circuit is configured to: generate a fifth signal from the demodulated fourth signal based on the offset error information from the demodulated fourth signal, demodulate the third signal with a PDH demodulation signal; and generate the output signal by combining the fifth signal with the demodulated third signal.

Example 13 includes the system of any of Examples 7-12, wherein the PDH offset servo circuit is configured to adjust a direct current (DC) offset value of a PDH loop setpoint based on the offset error information.

Example 14 includes the system of any of Examples 7-13, wherein the offset error information includes at least one of: an amplitude of the demodulated fourth signal, or a common demodulation frequency.

Example 15 includes the system of any of Examples 7-14, wherein the system is a resonance fiber optic gyroscope (RFOG).

Example 16 includes a method for reducing Pound-Drever-Hall (PDH) offset error in an optical gyroscope, comprising: generating, by a PDH offset servo circuit, a first signal by demodulating a signal corresponding to a counterpropagating signal with a quadrature demodulation signal at a common frequency, wherein the counterpropagating signal is one of a clockwise (CW) signal or a counterclockwise (CCW) signal, wherein the common frequency is a frequency used for modulating and/or demodulating an output of at least one laser of the optical gyroscope; generating, by the PDH offset servo circuit, a second signal based on offset error information determined from the first signal; combining, by the PDH offset servo circuit, the second signal with a signal having the common frequency; and generating, by the PDH offset servo circuit, an output signal based on the second signal and the signal having the common frequency, wherein the output signal represents a compensated PDH error signal based on the offset error information.

Example 17 includes the method of Example 16, comprising adjusting a direct current (DC) offset value of a PDH loop setpoint based on the offset error information.

Example 18 includes the method of any of Examples 16-17, wherein the offset error information includes at least one of: an amplitude of the first signal, or a common demodulation frequency.

Example 19 includes the method of any of Examples 16-18, comprising: receiving a signal corresponding to a resonance frequency of an optical resonator coupled to the PDH offset servo circuit; generating a third signal by demodulating the signal corresponding to the resonance frequency with a PDH demodulation signal; generating the output signal based on the third signal.

Example 20 includes the method of Example 19, comprising generating a fourth signal configured to adjust an output frequency of a laser of the optical gyroscope to the resonance frequency of the optical resonator.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A Pound-Drever-Hall (PDH) offset servo circuit, comprising:

a first mixer configured to receive a signal corresponding to a clockwise (CW) or counterclockwise (CCW) counterpropagating signal, and to receive a quadrature demodulation signal at a common frequency, wherein the common frequency is a frequency used for modulating and/or demodulating an output of at least one laser, wherein the first mixer is configured to generate a first signal by demodulating the signal corresponding to the CW or CCW counterpropagating signal with the quadrature demodulation signal;

a second mixer configured to receive a signal corresponding to a resonance frequency of an optical resonator coupled to the PDH offset servo circuit, wherein the second mixer is configured to generate a third signal by demodulating the signal corresponding to the resonance frequency with a PDH demodulation signal; and a controller comprising at least one processor coupled to the first mixer and the second mixer, wherein the controller is configured to:

generate a second signal based on offset error information from the first signal, and combine the second signal with the third signal to generate an output signal, wherein the output signal represents a PDH error signal compensated based on the offset error information.

2. The PDH offset servo circuit of claim 1, wherein the output signal is configured to adjust a direct current (DC) offset value of a PDH loop setpoint based on the offset error information.

3. The PDH offset servo circuit of claim 1, wherein the controller comprises a first summing node, wherein the first summing node is configured to:

receive a signal having the common frequency; and generate a fourth signal based on the offset error information and the signal having the common frequency.

4. The PDH offset servo circuit of claim 3, wherein the first summing node is configured to:

receive the third signal from the second mixer; and generate the output signal based on the third signal and the fourth signal, wherein the fourth signal represents the PDH error signal compensated based on the offset error information.

5. The PDH offset servo circuit of claim 1, wherein the offset error information includes at least one of: an amplitude of the first signal, or the common frequency.

6. The PDH offset servo circuit of claim 1, wherein the controller comprises a proportional-integral-derivative (PID) controller or a proportional-integral (PI) controller.

7. A system, comprising:

a first laser configured to produce a first signal at a first frequency;

a second laser configured to produce a second signal at a second frequency;

at least one modulator coupled to the first laser and the second laser, wherein the at least one modulator is configured to modulate the first signal and the second signal at a common frequency;

an optical resonator coupled to the first laser and the second laser, wherein the optical resonator comprises an optical coil, wherein the first signal propagates about the optical coil in a clockwise (CW) direction, wherein the second signal propagates about the optical coil in a counterclockwise (CCW) direction;

a Pound-Drever-Hall (PDH) system coupled to the optical resonator, wherein the PDH system comprises a PDH offset servo circuit and PDH loop circuitry, wherein the PDH offset servo circuit is configured to receive a third signal corresponding to a resonance frequency of the optical resonator and a fourth signal that corresponds to either the first signal or the second signal;

wherein the PDH offset servo circuit is configured to:

demodulate the fourth signal with a quadrature demodulation signal at the common frequency, determine offset error information from the demodulated fourth signal, and generate an output signal based on the offset error information from the demodulated fourth signal and the third signal, wherein the output signal represents a PDH error signal compensated based on the offset error information;

wherein the PDH loop circuitry is configured to generate at least one control signal based on the output signal, wherein the at least one control signal is configured to lock a frequency of a laser to the resonance frequency of the optical resonator.

8. The system of claim 7, further comprising:

a master laser coupled to the first laser and the second laser, wherein the master laser is configured to generate a master signal at a third frequency that is combined with the first signal and/or the second signal;

a first phase lock loop circuit coupled to an input of the first laser, wherein the first phase lock loop circuit is configured to lock the first frequency of the first signal to the third frequency; and a second phase lock loop circuit coupled to an input of the second laser, wherein the second phase lock loop circuit is configured to lock the second frequency of the second signal to the third frequency;

wherein the at least one control signal from the PDH loop circuitry is configured to lock the third frequency of the master laser to the resonance frequency of the optical resonator, wherein the first laser and the second laser are configured to use the master signal generated based on the PDH error signal in locking the respective first signal and the second signal to the resonance frequency of the optical resonator.

9. The system of claim 7, further comprising rate calculation circuitry, wherein the rate calculation circuitry is configured to determine a rate of rotation of a vehicle based on a frequency difference between the first signal and the second signal.

10. The system of claim 7, wherein the PDH offset servo circuit is configured to adjust a direct current (DC) offset value of a PDH loop setpoint based on the offset error information.

11. The system of claim 7, wherein the PDH offset servo circuit is configured to:

determine a proportional correction value based on a measured value of the offset error information;

determine an integral correction value based on an accumulation of the offset error information over a period of time; and generate the output signal based on the proportional correction value and the integral correction value.

12. The system of claim 7, wherein the PDH loop circuit is configured to:

generate a fifth signal from the demodulated fourth signal based on the offset error information from the demodulated fourth signal;

demodulate the third signal with a PDH demodulation signal; and generate the output signal by combining the fifth signal with the demodulated third signal.

13. The system of claim 7, wherein the PDH offset servo circuit is configured to adjust a direct current (DC) offset value of a PDH loop setpoint based on the offset error information.

14. The system of claim 7, wherein the offset error information includes at least one of: an amplitude of the demodulated fourth signal, or a common demodulation frequency.

15. The system of claim 7, wherein the system is a resonance fiber optic gyroscope (RFOG).

16. A method for reducing Pound-Drever-Hall (PDH) offset error in an optical gyroscope, comprising:

generating, by a PDH offset servo circuit, a first signal by demodulating a signal corresponding to a counter-propagating signal with a quadrature demodulation signal at a common frequency, wherein the counter-propagating signal is one of a clockwise (CW) signal or a counterclockwise (CCW) signal, wherein the common frequency is a frequency used for modulating and/or demodulating an output of at least one laser of the optical gyroscope;

generating, by the PDH offset servo circuit, a second signal based on offset error information determined from the first signal;

combining, by the PDH offset servo circuit, the second signal with a signal having the common frequency; and generating, by the PDH offset servo circuit, an output signal based on the second signal and the signal having the common frequency, wherein the output signal represents a compensated PDH error signal based on the offset error information.

17. The method of claim 16, further comprising adjusting a direct current (DC) offset value of a PDH loop setpoint based on the offset error information.

18. The method of claim 16, wherein the offset error information includes at least one of: an amplitude of the first signal, or a common demodulation frequency.

19. The method of claim 16, further comprising:

receiving a signal corresponding to a resonance frequency of an optical resonator coupled to the PDH offset servo circuit;

generating a third signal by demodulating the signal corresponding to the resonance frequency with a PDH demodulation signal; and generating the output signal based on the third signal.

20. The method of claim 19, further comprising generating a fourth signal configured to adjust an output frequency of a laser of the optical gyroscope to the resonance frequency of the optical resonator.

* * * * *